United States Patent
Vandenhoeck

[11] 3,990,857
[45] Nov. 9, 1976

[54] APPARATUS FOR CONTROLLABLY INTRODUCING PARTICULATE MATERIAL INTO A REACTOR BY DISTURBANCE OF THE NATURAL ANGLE OF REPOSE THEREOF

[76] Inventor: Jean-Paul Vandenhoeck, 300 Riverside Drive, New York, N.Y. 10025

[22] Filed: Mar. 31, 1975

[21] Appl. No.: 563,634

Related U.S. Application Data

[62] Division of Ser. No. 223,198, Feb. 3, 1972, Pat. No. 3,876,383.

[52] U.S. Cl. .............................. 23/284; 23/277 C; 23/288 G; 34/10; 34/57 A; 222/457; 302/57; 302/66; 214/18 R
[51] Int. Cl.² .......................................... B01J 9/18
[58] Field of Search ............... 23/277 C, 284, 288 S, 23/288 G; 34/10, 57 A; 302/31, 35, 45, 53, 57, 17

[56] References Cited
UNITED STATES PATENTS

| | | | |
|---|---|---|---|
| 2,192,287 | 3/1940 | Goebels | 302/45 |
| 2,439,582 | 4/1948 | Scheineman | 23/288 S |
| 2,674,338 | 4/1954 | Lindsey et al. | 23/288 G X |
| 2,684,869 | 7/1954 | Lapple | 23/288 S |
| 2,726,137 | 12/1955 | Davis | 23/288 S X |
| 2,913,281 | 11/1959 | Le Bauc, Jr. | 302/35 |
| 2,943,997 | 7/1960 | MacLaren et al. | 23/288 S X |

*Primary Examiner*—James H. Tayman, Jr.
*Attorney, Agent, or Firm*—Hubbell, Cohen, Stiefel & Gross

[57] ABSTRACT

An apparatus for controllably introducing particulate material into the interior of a hollow reactor housing in a predetermined particulate material flow path having a predetermined directional flow for enabling reaction of the particulate material within the housing interior includes means for collecting a pile of particulate material injected into the interior to provide a pile having an unsupported surface oriented to the horizontal at a predetermined natural angle of repose of the particulate. Means are located within the collected pile for introducing a thin stream of fluid into the interior of the collected pile from beneath the pile in the same direction as the predetermined direction of material flow to disturb the natural angle of repose equilibrium condition of the pile for impelling a portion of the collected particulate from the surface into the flow path.

4 Claims, 12 Drawing Figures

APPARATUS FOR CONTROLLABLY INTRODUCING PARTICULATE MATERIAL INTO A REACTOR BY DISTURBANCE OF THE NATURAL ANGLE OF REPOSE THEREOF

CROSS-REFERENCE TO RELATED APPLICATIONS

This application is a divisional of my U.S. patent application, Ser. No. 223,198 filed Feb. 3, 1972, entitled "Apparatus Utilizing Counter-Current Interaction", now U.S. Pat. No. 3,876,383, issued Apr. 8, 1975.

BACKGROUND OF INVENTION

1. Field of the Invention

The present invention relates to an apparatus utilizing counter-current interaction and such apparatus in which the rate of flow of particulate material in such interaction is controllably varied through the associated material path in which such interaction occurs.

2. Description of the Prior Art

Reactors or vessels in which interaction between materials, such as thermal interaction, occur are well known. Several of these reactors are of the type in which particulate material is introduced above a plate or tray having a multiplicity of closely spaced perforations through it, a gas being spaced at a temperature above or below that of the particulate being directed upwardly through the plate, the gas flow being sufficient to produce a turbulent bed of particulate above the plate yet permitting the downward passage of particulate through the plate, thereby exchanging heat between the particulate and the gas. This type of thermal interaction is based on counter-current flow. Such a reactor is described in U.S. Pat. No. 3,263,346 and corresponding British Pat. No. 1,102,264, both of which are herein specifically incorporated by reference in their entirety.

In such a reactor a plurality of spaced apart perforated trays or plates are normally provided, the perforations being sufficiently large so that the largest particles handled by the apparatus may easily pass through them. The particulate passes downwardly through the perforations in the plates, the upward velocity of the gas being insufficient to convey upwardly the average particle of the particulate handled. Thus, the particles drift downwardly towards the perforated tray at a velocity which is less than the settling velocity of a particle with no counter air flow, the particle being subjected to the relatively high velocity jet action of the gas passing through the perforations in the plate as the particles approach the plate. This jet velocity is considerably higher than the average particle settling velocity, and, accordingly, the particles are accelerated upwardly until the jet action of the air is dissipated. This results in the creation of a turbulent bed above the plates or trays. Furthermore, in such prior art reactors, because of the spacing of the perforations in the trays, there are quiescent zones above the plate in which there is little or no upward air movement. In these zones the particles drift downwardly to the plate or tray where they are again subject to reentrainment in the gas and flow upwardly or pass through the perforations in the tray. The counter current flow associated with these prior art trays is as follows.

The gas passes upwardly through a perforation in the tray and is contracted toward the center of the aperture, thus allowing particles of material to flow downwardly through the aperture at the sides thereof. If the flow rate through the aperture is not sufficient to accommodate all the particles presenting themselves to the aperture without blocking the aperture, the air flow is temporarily cut off and is transferred to another unblocked aperture. As soon as the air flow stops, the temporarily retained particles are released until blockage is eliminated and the air flow is reestablished through the aperture. The particles of material pass downwardly through one perforated plate into another turbulent bed formed above the next adjacent perforated plate wherein the same action is repeated.

In such prior art reactors, the cooling of the particles of material is dependent upon the amount of time during which the material is retained within the vessel or, in other words, the amount of time provided for interaction of the particulate and the associated material or gas with which interaction occurs. This retention time, in prior art reactors, is determined by the size of the particles, the air velocity, the number of perforated plates positioned within the vessel, and the size and number of the perforations in the trays. The level of each turbulent bed of material above a particular perforated plate or tray is determined by the size of the material, the velocity of the air through the perforations, and the number and size of the perforations. This retention time is a critical factor dependent on the desired interaction and, in the instance of thermal interaction, is dependent on the desired end result thermal exchange. In addition, in prior art reactors utilizing a plurality of perforated trays, each of which allows a turbulent bed of material to be formed, the material is cooled or interaction occurs, in what may be considered a step-by-step process, each bed providing a step in the process. Such prior art reactors, however, are not satisfactory in that they utilize presized trays whose size has been set for a given fixed retention time dependent on the temperature of the substance to be cooled. However, this temperature normally varies during the reaction and, since the retention time and particulate or media flow cannot then subsequently be adjusted, unsatisfactory results may be obtained. Furthermore, such variation in retention time and particulate flow cannot be externally controlled.

In addition, multi-stage or plural stage reactors, such as two-stage reactors, require the use of some mechanical valve means between the various stages so as to insure isolation between the stages when two different materials are to be operated on independently in separate reactions. Such mechanical means have not been satisfactory.

These disadvantages of the prior art are overcome by the present invention.

SUMMARY OF THE INVENTION

A reactor includes means for directing a material, such as a fluid, through the reactor in a predetermined material path. Perforated plate means, such as perforated trays, are located in the material path and means are provided for directing particulate material, such as ceramic beads, through the perforated plate means and though the material path in a direction opposite the direction of material flow therethrough for reacting with the material. This flow is normally known as counter-current flow. The directing means includes means for controllably varying the rate of flow of the particulate material through the material path in accordance with variations in a predetermined parameter associated with the reaction, such as the retention time of the particulate material within the material path. The means for controllably varying the rate of flow of the particulate material preferably includes means for establishing a pile of such particulate at the point of introduction of particulate into a given location in the reactor, the pile having an unsupported surface oriented to the horizontal at a predetermined angle of repose of the particulate material. Means are also provided for disturbing this angle of repose such as by applying to the interior of this pile a stream of fluid to impel a portion of the particulate material from the outer surface thereof into the desired location, such as in accordance with variations in the density of collected particulate material in the pile.

The reactor may be a multi-stage reactor wherein the stages are preferably sealed from one another by means of particulate material collected between stage, the flow from one stage to another being preferably regulated by the aforementioned means for controllably varying the rate of flow of the particulate material. Thus, the particulate material, and not a mechanical means, acts as the seal between the stages. Each of the stages in such a reactor preferably includes a plurality of perforated plates or trays located in the material path in each of the reactors. In a two-stage reactor, such as one in which heat exchanges occur, the upper stage may be utilized to cool a hot fluid by means of introducing cool particulate for interaction therewith and the lower stage may be utilized to recuperate the heat from the particulate by interaction with a cool fluid introduced therein, the cooled particulate now being collected at the bottom of the reactor for reintroduction into the upper stage.

Preferably, particulate flow regulators are utilized at one or more of the trays in each stage to control the retention time associated with the particular tray. In addition, the trays are preferably divided into segments, each segment having an associated particulate flow regulator. Preferably, the particulate flow is related to the fluid flow depending on the specific heat between the particulate and the fluid such that the specific heat of the particulate flow on a weight basis is equal to the specific heat of the fluid flow on a weight basis in order to provide optimum efficiency for the reactor.

BRIEF DESCRIPTION OF DRAWING

FIG. 12 is a fragmentary sectional view, similar to FIG. 7, of an alternative embodiment of the particulate flow regulator.

DETAILED DESCRIPTION OF THE PREFERRED EMBODIMENTS

Figure 1:
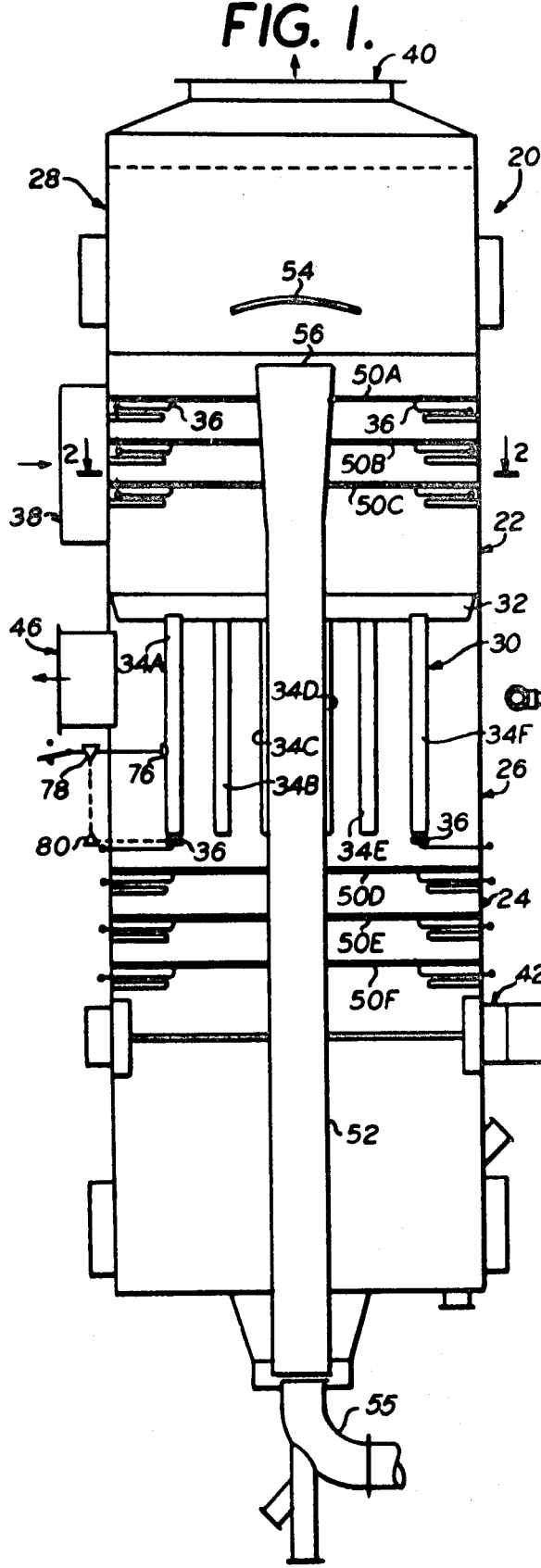
FIG. 1 is a diagrammatic illustration of a preferred embodiment of a reactor constructed in accordance with the present invention.

Referring now to the drawings in detail, and particularly to FIG. 1 thereof, a two-stage reactor, generally referred to by the reference numeral 20, constructed in accordance with the preferred embodiment of the present invention is shown, by way of example and not by way of limitation. As will be explained in greater detail hereinafter, if desired, a reactor having more than two stages or a single stage reactor may be constructed in accordance with the present invention without departing from the spirit and scope thereof.

TWO-STAGE REACTOR

The two-stage reactor 20 shown in FIG. 1 preferably comprises three sections, an upper section or stage 22, a lower section or stage 24, and a middle section 26 which provides a seal between the upper and lower stages 22 and 24, as will be described in greater detail hereinafter. For purposes of illustration we shall describe the reactor 20 as a heat exchanger in which thermal interaction occurs although, as will be apparent to one of ordinary skill in the art, any reaction such as a chemical reaction may also be accomplished by the interaction of materials in accordance with the present invention. Furthermore, the present invention shall be described, by way of example, with reference to the interaction between a particulate material and a fluid material which is a gas. Such interaction is described by way of example and not by way of limitation as it will become apparent to one of ordinary skill in the art that the interaction could also be between solid and solid, fluid and solid, or fluid and fluid, wherein the fluid could be either gaseous or liquid.

Preferably, the reactor 20 includes a cylindrical hollow housing 28, although any other desired configuration could be utilized for the housing 28. As was previously mentioned, the upper stage 22 interior is isolated from the lower stage interior 24 by sealing means 30 provided in the middle section 26. The sealing means 30 preferably comprises a perforated plate 32 extending transversely across the interior of the housing 28 to separate the interiors of the upper and lower stages 22 and 24, respectively. Each of the apertures in the perforated plate 32 has an associated collection column 34A, 34B, 34C, 34D, 34E and 34F, six such columns being shown by way of example, for a purpose to be described in greater detail hereinafter. Suffice it to say at this point that each of the collection columns 34A through 34F, inclusive, includes an associated particulate flow regulator 36 (only two being shown by way of example in FIG. 1, the others being omitted for purposes of clarity) to be described in greater detail hereinafter. Suffice it to say that the function of the collection columns 34A through 34F and associated particulate flow regulators 36, is to provide a seal between the upper and lower stages 22 and 24 by virtue of the particulate material collected and densely packed in the collection columns 34A through 34F and to regulate the distribution or transfer of particulate material from the upper stage 22 to the lower stage 24 while continuing to maintain the seal between the stages 22 and 24.

The upper stage 22 portion of the housing in the thermal exchanger or reactor being described by way of example includes an inlet 38 for a gas, which in the example being described is a hot gas at a higher temperature than the particulate introduced into this stage 22, and an outlet 40 for this gas after it has been cooled due to the thermal reaction occurring, by way of example, within the upper stage 22. The lower stage housing portion 24 in the example being described includes an inlet 42 for a cool gas such as air provided at a low temperature or ambient which is at a lower temperature than the heated particulate introduced into this stage 24 from the upper stage 22, the gas being introduced such as by means of a conventional fan and blower arrangement 44, and an outlet 46 for the gas after it has been heated due to the thermal reaction occurring, by way of example, within the lower stage 24. Both the upper and lower stages 22 and 24 preferably contain a plurality of longitudinally spaced apart perforated trays, three such trays being shown in each stage by way of example, 50A, 50B and 50C for upper stage 22 and 50D, 50E and 50F for lower stage 24, each of the perforated trays 50A through 50F preferably being identical. The perforated trays 50A through 50F, which will be described in greater detail hereinafter, are shown in greater detail in FIGS. 2 through 5. Suffice it to say at this point that the perforated trays 50A through 50F are each respectively mounted by means of an internal lip provided within the interior of the respective housing portions 22 and 24, the lip preferably being circumferential. The perforated trays 50A through 50F are preferably freely mounted on the respective lips and are preferably slightly smaller in radial dimension than the radial dimension of the interior of the respective housing portions 22 and 24 so as to create a dead space adjacent the interior wall of the housing portions 22 and 24, the lip permitting lateral movement but blocking particulate flow between trays adjacent the ends of the trays.

As will be described in greater detail hereinafter, each of the trays 50A through 50F preferably is divided into segments and each segment preferably has an associated particulate flow regulator 36 similar to the regulator 36 utilized in conjunction with the collection columns 34A through 34F, only two such regulators 36 being shown at each tray 50A through 50F for purposes of illustration, the others being omitted for purposes of clarity. However, it is of course understood that, if desired, such particulate flow regulators 36 need not be utilized in conjunction with each tray 50A through 50F nor need one be utilized in conjunction with each segment of an associated tray, the location and quantity of the particulate flow regulators 36 associated with the perforated trays 50A through 50F being dependent on the desired retention time at each tray within the associated stage 22 or 24. Furthermore, if desired, if variations in retention time are permissible or negligible, then either upper stage 22 or lower stage 24 or both need not utilize associated particulate flow regulators 36 with the various perforated trays 50A through 50F therein.

As was previously mentioned, the reaction occurring in reactor 20 described by way of example is a particulate-gas fluid interaction for both upper stage 22 and lower stage 24. As shown and preferred in FIG. 1, the particulate material is directed to the top of upper stage 22 through a central column or particulate inlet pipe 52 such as by means of a conventional blower (not shown). The particulate inlet pipe 52 is preferably coaxial with the longitudinal axis of the reactor 20 although, if desired, such inlet pipe 52 need not be coaxial. Preferably, a deflection plate 54 is axially spaced from the outlet end 56 of particulate inlet pipe 52 for deflecting particulate supplied from pipe 52 which strikes deflection plate 54, the particulate being directed downward towards perforated tray 50A in a fine spray. If desired, the deflection plate 54 need not be utilized but rather the particulate could be directed out of pipe 52 at exit end 56 at a velocity such that just after exiting from pipe 52 the particulate would be directed downward in a spray due to gravity.

Figure 6:
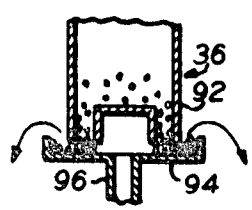
FIG. 6 is an enlarged fragmentary view of a preferred embodiment of a particulate flow regulator constructed in accordance with the present invention.
Figure 8:
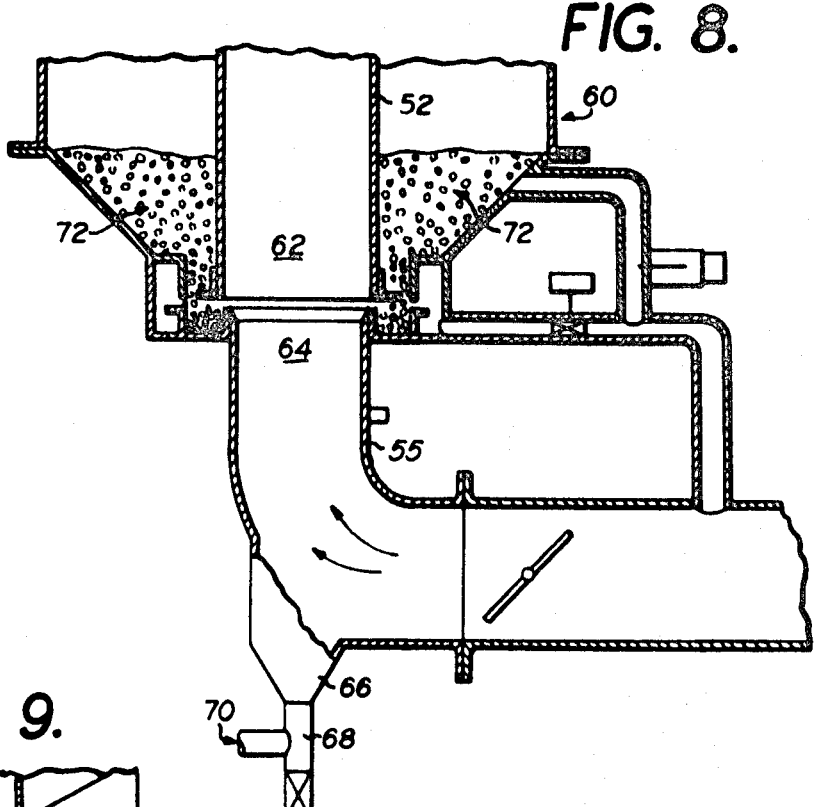
FIG. 8 is an enlarged fragmentary view of the embodiment shown in FIG. 1 illustrating the particulate collection portion at the bottom thereof.
Figure 7:
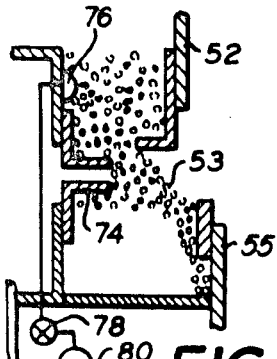
FIG. 7 is an enlarged fragmentary view of the embodiment shown in FIG. 6.

Referring now to FIGS. 6, 7 and 8, a particulate flow regulator 60 is shown. Preferably, the particulate flow regulator 60 is provided at the bottom of reactor 20 beneath the lower stage 24 in communication therewith for collecting particulate material which has passed from upper stage 22 through middle section 26 and then through lower stage 24 to the bottom of the reactor 20 for purposes of recirculation of the particulate material. The particulate flow regulator 60 shown in FIG. 8 is utilized to introduce a variable gravity flow of particulate material into the pipe 52 and therefrom into the interior of the reactor 20 at exit end 56. Preferably, a gas stream is supplied by means of a blower (not shown) through pipe 55 which is in communication with particulate inlet pipe 52, the gas being supplied at a sufficient velocity to pneumatically convey the stream of collected particulate material up the pipe 52 toward the exit end 56 while minimizing contact between the particulate material and the inner walls of the pipe 52 due to the provision of a gas buffer between the particulate entrainment zone and accelerating zone 62. This permits injected gas flow to separate itself from particulate flow thereby causing a flow of gas free of particulate to flow upwardly adjacent the inner walls of pipe 52 thereby eliminating contact between the particulate and these walls. Preferably, the gas stream has a higher velocity in the particulate entrainment zone portion 64 than in the particulate conveying zone portion 62 so as to reverse the inertial force acting on the particulate due to its gravity flow introduction in the interior of pipe 52 without causing undue particulate velocity in the conveying zone portion 62, thereby both reducing abrasion and the energy required to convey the particulate up the pipe 52.

As shown and preferred in FIG. 8, a concentric hopper 66 is preferably provided at the bottom of particle entrainment zone 64 in order to collect particulate which has not been entrained in the acceleration zone 64. The hopper 66 preferably conducts the collected particulate into a small diameter duct 68 through which a high velocity gas stream has been introduced by means of an inlet pipe 70. This preferably causes the reinjection of this collected particulate at a high velocity into the acceleration zone 64. The amount of particulate introduced into pipe 52 is controllably varied in accordance with a predetermined parameter such as the density of collected particulate 72. The particulate 72 is preferably collected at the bottom of the reactor 20 in a funnel shaped portion which produces a pile of particulate material about the exterior of pipe 52.

As can be seen in FIG. 7, the particulate flow regulator 60 comprises a series of walls arranged so as to create a pile of particulate material having an unsupported surface oriented to the horizontal at a predetermined angle of repose of the particulate material, such as ceramic beads. This angle of repose provides an inclined pile 53 with respect to the interior of pipes 52 and 55. An inlet pipe 74 is provided in communication with the interior of pile 53 which has the predetermined angle of repose. A stream of gaseous fluid is supplied through inlet pipe 74 to the pile 53 in order to disturb this angle of repose and impel a portion of the particulate material from the outer surface of the pile 53 into the interior of pipes 52 and 55 from which this particulate is accelerated up the inlet pipe 52 to be supplied to the interior of the reactor 20. Thus, by disturbing the angle of repose of the particulate material, the amount of particulate material introduced into the reactor may be controllably varied. Preferably, this rate of introduction is controllably varied by means of a closed feedback loop including a sensor means 76 for sensing the gas pressure within the collection portion of the particulate flow regulator 60 which sensor 76 is conventional and generates a control signal in accordance with variations in this gas pressure, predetermined values of such gas pressure corresponding to predetermined densities of collected particulate material, such calibration being conventional.

The closed loop further includes regulation means such as a conventional valve 78, for regulating the flow of the stream of fluid introduced to the interior of pile 53 via inlet pipe 74, the valve 78 beingn responsive to the control signal supplied by sensor 76 for varying the rate of flow of the gaseous fluid stream provided by a convenional blower 80. In this manner the amount of gaseous fluid supplied to the interior of pile 53 via inlet pipe 74 and, hence, the amount of particulate impelled therefrom, is controllably varied in accordance with variations in the density of collected particulate material, such density providing an indication of the retention time of the particulate material within the reactor 20.

Referring once again to FIGS. 2 through 6, a typical preferred perforated tray 50A is shown. As was previously mentioned, remaining trays 50B through 50F are all preferably identical therewith and will not be described in greater detail hereinafter. Since the interior of the reactor 20 is preferably cylindrical, tray 50A is preferably circular and is preferably freely mounted on its associated internal lips coaxial with inlet pipe 52 which passes through the center 82 thereof. Each of the trays 50A through 50F is preferably fabricated out of a temperature resistant material which can withstand the temperature of reaction occurring within the associated stages 22 and 24 and which will preferably not react with the materials utilized therein.

Figure 2:
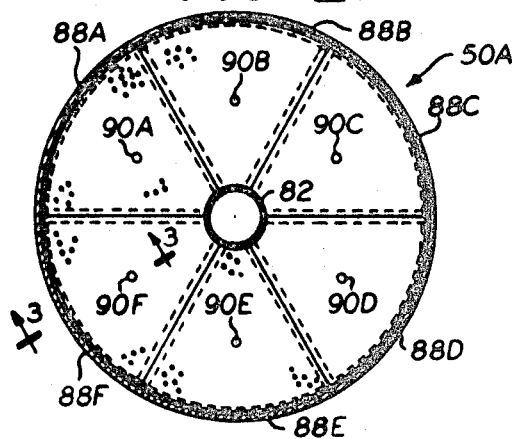
FIG. 2 is a sectional view of a perforated tray of the embodiment shown in FIG. 1 taken along line 2—2.

As was previously mentioned, the weight of the tray is preferably the sole means for holding the tray in position in the interior of the reactor in conjunction with a supporting bracket or lips. In this manner maintenance is facilitated and temperature expansion is allowed for. As shown in FIG. 2, the tray 50A preferably comprises a plurality of segments, six such segments 88A, 88B, 88C, 88D, 88E and 88F being shown by way of example. Preferably the perforations contained in the tray 50A and, hence, in each of the segments therein, are sufficiently large to permit the largest particles of the particulate material utilized to pass through them and to enable counter-current flow to occur between the particulate material and the gas present in the associated stage 22 or 24 for creating a turbulent bed of particulate material on the upper side of the perforated tray 50A. Most preferably, these holes or apertures are in sufficient numbers so as to provide a 25% open area for the tray although this open area may be from 15% to 75% if desired. In addition, each of the segments preferably contains a drain hole or bleeder hole 90A, 90B, 90C, 90D, 90E, and 90F, respectively, preferably located at the geometric center of the associated segment. The purpose of the drain hole 90 is to bleed out particulate material from the perforated tray as required for controllably varying the particulate flow to the tray below in conjunction with an associated particulate flow regulator 36 in addition to the normal flow of particulate material due to the counter-current flow occurring at the perforations in the tray 50A.

As was previously mentioned, and as was described in U.S. Pat. No. 3,263,346, in accomplishing this counter-current flow, the particulate drifts downwardly towards the plate 50A at a velocity which is less than the settling velocity of a particle with no counter air flow. As the particles approach the plate 50A they are subjected to the relatively high velocity jet action of the gas, such as the gas from inlet 38, passing through the perforations in the plate or tray 50A. Since the jet velocity is preferably considerably higher than the average particle settling velocity, the particles are accelerated upwardly until the jet action of the gas is dissipated. This results in the creation of a turbulent bed above the plate 50A. Because of the spacing of the perforations in the tray 50A, there are quiescent zones above the tray 50A in which there is little or no upward gas movement. In these zones the particles drift downwardly to the tray 50A where they are again subject to reentrainment in the gas and flow upwardly or pass through the perforations in the tray 50A.

However, as was previously mentioned, in addition to this counter-current flow for introducing particles from one tray to the adjacent tray below, the drain holes or bleeder holes 90 enable the overall rate of particulate flow between trays to be controllably varied in conjunction with an associated particulate flow regulator 36.

PARTICULATE FLOW REGULATOR

Figure 3:
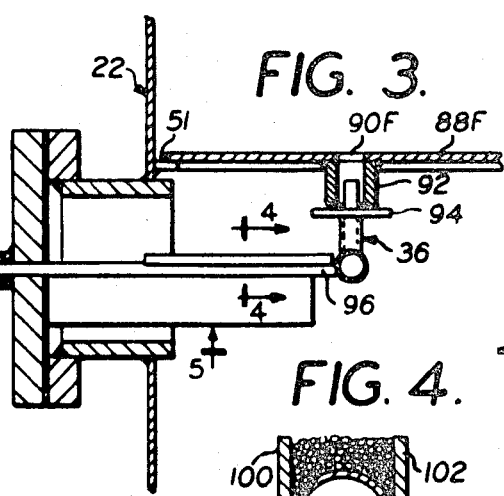
FIG. 3 is an enlarged fragmentary sectional view of the embodiment shown in FIG. 2 taken along line 3—3.

Referring now to FIG. 3, a typical particulate flow regulator 36 associated with segment 88F is shown by way of example, the arrangement illustrated therein preferably being identical with that associated respectively with segments 88A through 88E inclusive. The tray 50A is shown mounted on lip 51. A collection column 92, forming part of the particulate flow regulator 36 is in communication with drain hole 90F for collecting substantially all of the particulate material which is bled through drain hole 90F. The collected particulate material is packed in collection pipe 92 which preferably has a coaxial disc 94 at the bottom thereof. The disc 94 and the collection pipe 92 cooperate to form a pile of particulate material having an unsupported surface oriented to the horizontal at a predetermined angle of repose of the particulate material, similar to that illustrated in FIG. 7 and previously described. The associated structure of particulate flow regulators 36, which may be identical to that illustrated in FIG. 7, is preferably that illustrated in FIG. 6. Disc 94, as shown and preferred in FIG. 6, preferably includes an upstanding outer edge or lip and is spaced from the exit end of collection pipe 92 a sufficient distance so as to enable the formation of the pile of particulate material having an unsupported surface oriented to the horizontal at the predetermined angle of repose of the particulate material.

Preferably, an inlet pipe 96 is in communication with the interior of disc 94 and is coaxial therewith, the inlet pipe 96 preferably supplying a fluid stream to the interior of the pile of particulate material formed on disc 94, and most preferably a gaseous fluid stream. As is shown and preferred in FIG. 6, the interior of collection pipe 92 is provided with a peripheral channel for the gaseous fluid stream supplied through inlet pipe 96 which channel enables the input stream to be supplied to the pile of particulate material in order to disturb the angle of repose and impel the portion of the particulate material from the unsupported surface towards the next adjacent tray below. By regulating the gaseous fluid stream supplied via inlet pipe 96, the quantity of particulate material impelled from the unsupported surface of the pile may be regulated. As was previously mentioned, this fluid stream may be controllably varied in accordance with the density of the collected particulate material in pipe 92 in the manner previously described with reference to FIG. 7. Preferably, the rate of flow of the particulate material is controlled in the manner previously described with reference to FIG. 7, such as by a closed feedback loop, and will not be described in greater detail hereinafter, the associated circuitry being omitted for purposes of clarity.

Figure 4:
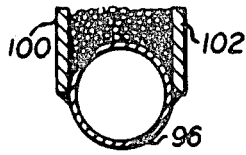
FIG. 4 is an enlarged partial sectional view of the embodiment shown in FIG. 3 taken along line 4—4.

As shown and preferred in FIG. 4, inlet pipe 96 is preferably protected from abrasion by means of providing upwardly extending lips 100 and 102 along the length of the transversely extending portion of inlet pipe 96, the upwardly extending lips 100 and 102 serving to initially collect particulate material on the upper exposed outer surface of the pipe 96 and thus prevent subsequent abrasion of this surface of pipe 96 due to the buffer provided by the collected particulate material.

Figure 5:
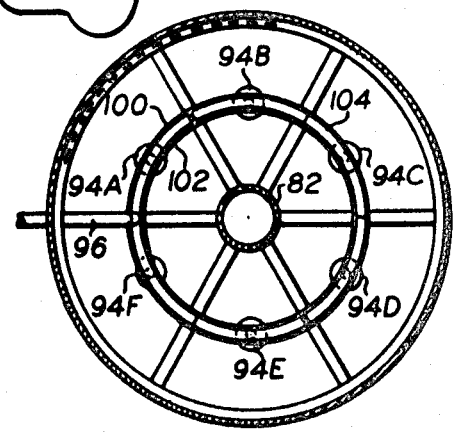
FIG. 5 is a bottom plan view of the embodiment shown in FIGS. 2 and 3 taken along line 5—5 of FIG. 3.
Figure 10:
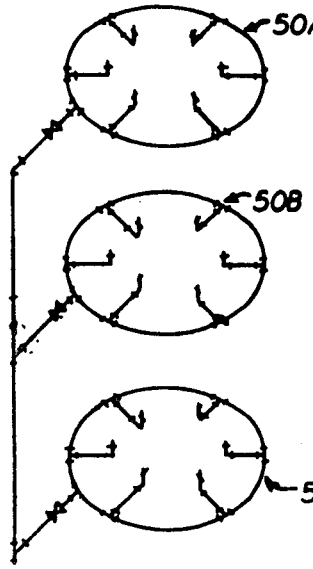
FIG. 10 is a diagrammatic illustration, similar to FIG. 5, of an alternative embodiment of the segmented particulate flow regulators associated with the perforated trays of the embodiment shown in FIG. 1.
Figure 11:
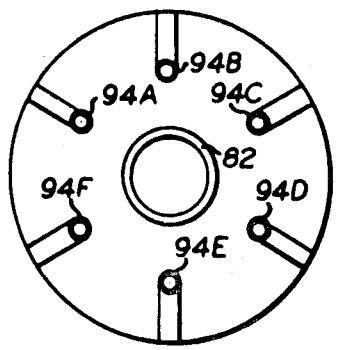
FIG. 11 is an enlarged bottom plan view, similar to FIG. 5, of the embodiment shown in FIG. 10.

As shown and preferred in FIG. 5, the plurality of particulate flow regulators 36 are preferably arranged on a circular pipe 104 which is in communication with inlet pipe 96 to simultaneously supply the fluid stream to all of the associated particulate flow regulators 36. In the arrangement shown in FIG. 5, upwardly extending lips 100 and 102 are provided on the circular pipe 104 for protecting the surface of this pipe from abrasion in the manner previously described with reference to FIG. 4. If desired, in place of the preferred arrangement illustrated in FIG. 5, the particulate flow regulator 36 and the associated inlet pipes therefor may be arranged in the manner illustrated in FIG. 10, in which instance the particulate flow regulators and associated inlet pipes at each tray level will appear as illustrated in FIG. 11.

Referring once again to FIG. 1, the particulate flow regulator 36 associated with the collection pipes 34A through 34F inclusive which enable the sealing of the upper stage 22 from the lower stage 24 by means of the densely packed particulate material collected therein, preferably function in the same manner previously described above with reference to the particulate flow regulator 36 associated with each segment of the tray 50A and have been given the same reference numeral. In addition, the rate of flow of particulate material through the associated collection pipes 34A through 34F inclusive is controllably varied, preferably, in the manner previously described with reference to FIG. 7 wherein the sensor 76 senses the pressure of the gas within the associated collection pipe 34A, by way of example, and generates a control signal in accordance therewith which control signal operates a valve 78 which controls the rate of flow of the gaseous fluid from blower 80 supplied via inlet pipe 96 to the interior of the pile formed on disc 94 for disturbing the angle of repose and impelling the portion of the particulate material from the surface of the unsupported pile. As was previously mentioned, this pressure is calibrated in accordance with the density of collected particulate material. If desired, in place of the closed feedback loop previously described, an ON-OFF switch could be provided to shut off or turn on the supply of gaseous fluid to the regulator 36 or, if desired, an associated alarm could be provided which would be activated when the pressure dropped below a predetermined level.

Figure 9:
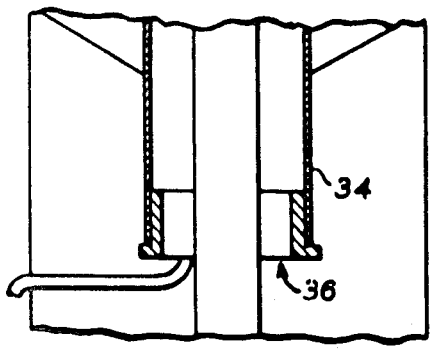
FIG. 9 is a fragmentary sectional view of the sealing portion between the two stages of the embodiment shown in FIG. 1 showing an alternative embodiment thereof.

If desired, in place of the plurality of collection pipes 34A through 34F shown and preferred in FIG. 1, a single centrally located collection pipe, preferably having a volume equivalent to the total volume of collection pipes 34A through 34F could be provided, as shown in FIG. 9. The particulate flow regulator 36 associated therewith is preferably identical with that previously described with reference to the plurality of collection pipes 34A through 34F and preferably only differs in terms of size, although being preferably identical in terms of operation.

OPERATION OF TWO-STAGE REACTOR

By way of example, the operation of the two-stage reactor 20 constructed in accordance with the preferred embodiment of thee present invention shall now be described in greater detail. As was previously described, for purposes of illustration, the operation of reactor 20 shall be described as a two-stage heat exchanger in which thermal interaction occurs although, as will be apparent to one of ordinary skill in the art, any reaction such as a chemical reaction may also be accomplished by the interaction of materials in accordance with the present invention. Furthermore, as was also previously described, this operation will be described, by way of example, with reference to the interaction between a particulate material and a gaseous fluid material although, as will also be apparent, the particulate could consist of at least two portions instead of one portion, such as a chemically active ingredient such as dolomite for collecting sulfur dioxide if that is the desired reaction and a flow characterization portion such as a scouring agent if it is desired to circumvent the shortcomings of such a chemically active material. In addition, the fluid material need not be gaseous and the interaction could be between solid and solid, fluid and solid, or fluid and fluid wherein the fluid could be either gaseous or liquid or, if desired, a slurry could be utilized.

Now describing the operation of reactor 20 with reference to the thermal interaction between the gas and the solid particulate in both the upper stage 22 and the lower stage 24. By way of example, the lower stage 24 has a relatively cool gas, such as 150° Fahrenheit to 200° Fahrenheit or ambient, supplied thereto through inlet 42. The upper stage 22 in this example has hot gas, such as at a temperature of 1,600° Fahrenheit, supplied thereto via inlet 38. As was previously described, the particulate material is directed to the top of upper stage 22 through the particulate inlet pipe 52, such as by means of a conventional blower. By way of example, the particulate directed through pipe 52 strikes deflection shield 54 and is directed downwardly towards perforated tray 50A in a fine spray. The hot gas within upper stage 22 interacts with the fine spray of particulate material directed through the fluid path of the gas in a thermal interaction wherein the gas is cooled and the particulate is heated due to conventional heat transfer.

At each of the perforated trays 50A through 50F, inclusive, a turbulent bed of particulate material is formed in a fashion similar to that described in U.S. Pat. No. 3,263,346 wherein as the particulate drifts downwardly towards the associated perforated tray at a velocity which is less than settling velocity of a particle with no counter-current air flow, it is subjected to the relatively high velocity jet action of the gas within the appropriate stage 22 or 24 passing through the perforations in the associated perforated tray 50. As was also previously mentioned, the jet velocity is preferably considerably higher than the average particle settling velocity and, accordingly, the particles are accelerated upwardly until the jet action of the gas is dissipated which results in the creation of the turbulent bed above the respective perforated tray. Because of the spacing of the perforations in the associated perforated tray, there are quiescent zones above the tray in which there is little or no upward air movement. In these zones the particles drift downwardly to the tray where they are again subject to reentrainment in the gas and flow upwardly or pass through the perforations in the tray 50. At each of these perforations, the gas passes upwardly through the perforations and is contracted towards the center of the aperture, thus allowing particles of material to flow downwardly through the aperture at the sides thereof. If the flow rate through the aperture is not sufficient to accommodate all the particles presenting themselves to the aperture without blocking the aperture, the gas flow is temporarily cut off and is transferred to another unblocked aperture. As soon as the gas flow stops, the temporarily retained particles are released until blockage is eliminated and the gas flow is reestablished through the aperture.

The particles of material pass downwardly through the closest adjacent perforated tray and into another turbulent bed from above the perforated tray immediately below wherein the action described above is repeated. However, in addition to the normal flow of particulate through the perforations, the passage of the particulate from one turbulent bed to the next adjacent turbulent bed is controllably regulated by means of the particulate flow regulators 36 at each perforated tray.

As was previously mentioned, in addition to the normal perforations, bleeder holes or drain holes 90A through 90F are provided at each tray at the geometric center of the tray segments 88A through 88F, respectively. In this manner the amount of particulate being introduced into the fluid path above the next adjacent perforated tray immediately below is controllably varied.

As was also previously mentioned in describing the associated particulate flow regulators 36, the manner of controlling the amount of particulate flow is by means of disturbing the natural angle of repose of the collected particulate material in collection pipe 92 by supplying a stream of gaseous fluid through associated inlet pipe 96 to the interior of the pile of particulate material collected on each of the discs 94 in order to disturb the angle of repose and impel a portion of the particulate material from the outer surface of the pile into the adjacent fluid path and subsequently to the perforated tray below. Preferably, as was also previously mentioned, this rate of introduction is controllably varied by means of a closed feedback loop wherein the gas pressure within the collection portion of the particulate flow regulator is sensed by conventional means and generates a control signal in accordance with variations in this gas pressure, predetermined values of such gas pressure corresponding to predetermined densities of collected particulate material (the calibration being conventional), this control signal being utilized to control a valve for regulating the flow of the stream of fluid introduced to the interior of the pile through pipe 96. By controllably varying the amount of particulate impelled from the pile in accordance with variations in the density of the collected particulate material, the retention time of the particulate material at the associated location in the reactor 20 of the associated tray 50 and flow regulator 36 and, hence, within the overall reactor 20 may be controllably varied.

Thus, if desired, at each perforated tray, and at each segment 88 thereof, the retention time of the particulate material may be controllably varied. The operation of the associated particulate flow regulators 36, as was previously mentioned, is in addition to the normal flow of particulate material due to the counter-current flow occurring at the perforations in the associated trays 50. It should be noted that preferably the particulate flow is related to the gas flow in accordance with the specific heat between the particulate and the associated gases such that the specific heat of the particulate flow on a weight basis is equal to the specific heat of the gas flow on a weight basis in order to obtain optimum efficiency in the reactor 20.

As the particulate passes from one turbulent bed to the next adjacent turbulent bed below, and interacts with the gaseous fluid, the gas is cooled at each level or tray in stages so that at the uppermost tray, in this instance 50A, the gas is at the desired cooled temperature, the particulate being heated to a desired temperature as a result of this interaction prior to passing into middle section 26 which seals the upper and lower stages 22 and 24, respectively. Continuing with this example, the particulate material passing downwardly through the perforated trays 50A through 50C via normal counter-current flow as well as particulate flow regulation within the fluid path, passes through perforated plate 32 and into the associated collection columns 34A through 34F which densely pack the collected particulate material therein so as to provide a seal between upper stage 22 and lower stage 24, such seal being due preferably only to the densely packed particulate within the associated collection pipes 34.

As was previously mentioned, each of the collection columns or pipes 34 includes an associated particulate flow regulator 36 whose operation is similar to that previously described with reference to the particulate flow regulators 36 utilized in conjunction with the perforated trays 50 and, thus, will not be described in greater detail hereinafter. Suffice it to say, that the associated particulate flow regulators 36 associated with the collection columns 34 enable the provision of a seal between the upper and lower stages 22 and 24 by virtue of the particulate material collected and densely packed in the collection columns 34 while regulating the distribution or transfer of particulate material from the upper stage 22 to the lower stage 24 while continuing to maintain this seal between the stages 22 and 24.

In the example being described, particulate material, which has been heated due to the thermal interaction occurring in the upper stage 22, is introduced into the fluid path in lower stage 24 above perforated tray 50D by means of the associated particulate flow regulators 36 associated with the collection columns 34. Subsequently, in the manner previously described above with reference to perforated tray 50A, a turbulent bed is formed above perforated tray 50D and, in the manner previously described, due to normal counter-current air flow as well as particulate flow regulation at the various segments 88 of the associated perforated tray, the heated particulate is directed through the gaseous fluid path of the introduced cool gas which is subsequently heated as it passes upwardly through each of the perforated trays 50F, 50E, and then 50D and, subsequently, to exhaust or outlet pipe 46, the mechanical operation of lower stage 24 preferably being identical with that of upper stage 22, the primary difference being that the reactions occurring in each of the stages 22 and 24 are thermodynamically reversed. Preferably, the perforated trays 50D through 50F and the retention time of the particulate material in lower stage 24 is controllably varied so as to enable the heated particulate material subsequently passing through the perforated trays 50D, 50E and 50F to be cooled back to approximately its original temperature at which it was introduced into upper stage 22 upon its entering the bottom of the reactor 20, the introduced cool gas being heated prior to exhaustion through outlet pipe 46, in the example given due to interaction with the heated particulate introduced into lower stage 24 via collection columns 34 and associated particulate flow regulators 36.

The recirculation of the particulate material collected at the bottom of reactor 20 is preferably controllably varied by means of particulate flow regulator 60 whose operation has been previously described with reference to FIGS. 6, 7 and 8. Suffice it to say that the natural angle of repose of the collected particulate material is disturbed in order to permit gravity flow within the gap formed between the pipes 52 and 55 so as to impel a portion of the outer surface of the pile 53 into the particle entrainment zone. If desired, however, no such regulation means need be utilized with respect to the recirculation of the collected particulate material which may just be collected at the bottom of the reactor 20 and pneumatically fed into particulate inlet pipe 52 in a stream which is of sufficient velocity to strike deflection shield 54 and deflect the particulate downwardly towards perforated tray 50A in a fine spray once again.

By way of example, a typical two-stage reactor similar to reactor 20 having the following parameters may be utilized in accomplishing the present invention wherein, in the lower stage 24, a cooled gas which is introduced at inlet 42 either at ambient or a temperature of approximately 150° Fahrenheit to 200° Fahrenheit is heated to a temperature of approximately 1,400° Fahrenheit at which it is exhausted through outlet 46 while cooling heated particulate from upper stage 22 which is introduced into lower stage 24 at a temperature of approximately 1,500° Fahrenheit, due to the thermal reaction occurring in the upper stage 22, to an original temperature of approximately 250° Fahrenheit, the particulate being introduced into the upper stage 22 at an original temperature of approximately 250° Fahrenheit cooling a gas introduced at inlet 38 at a temperature of approximately 1,600° Fahrenheit to a temperature of approximately 300° Fahrenheit where it is exhausted via outlet 40. In such an example, the particulate should preferably consist of ⅛ inch diameter alumina ball, the trays 50 should preferably have ¾ inch perforations providing a 25% open area and 1¼ inch drain holes 90, with 3 inch diameter plates or discs 94 being utilized with flow regulators 36 having an associated nozzle velocity of 5 CFM per nozzle, the spacing between the three perforated trays 50 in each of the stages 22 and 24 preferably being between 12 inches and 18 inches, the diameter of the reactor 20 preferably being 8 feet, the flow velocity of the particulate preferably being 900 pounds of particulate per minute circulation, the flow velocity of the gas in each of the stages preferably being 900 pounds of gas per minute circulation, and the air pressure from the associated particulate flow regulator nozzle preferably being injected at a pressure of 5 inches to 6 inches W.C. pressure. It should be noted that 0 CFM through 10 CFM of nozzle in the preferred particulate flow regulator 36 could preferably control 0 to 10 tons per hour of particulate flow in the preferred embodiment of the present invention.

It should also be noted that if desired, water could be injected into such a reactor to provide low pressure steam directly; slurry could be injected at certain temperature levels in the reactor, the temperature levels being determined by the perforated tray and the retention time at that tray, to obtain a desired chemical reaction; heat accumulation could be provided in such a reactor through the accumulation of high temperature particulate such as by providing a difference in the operating rate of BTU release between the upper and lower stages 22 and 24; or the particulate could be a catalytic agent for causing a desired chemical reaction, as well as many other utilizations too numerous to mention, but which will become apparent to one of ordinary skill in the art.

It should be noted that preferably, both the gas introduced into the lower chamber 24 and the gas introduced into the upper chamber 22 are preferably introduced through pipes having a plurality of apertures therein for introducing the gas in a plurality of jet velocity streams, such as through slits in a cover plate.

By utilizing the present invention the retention time associated with the various levels in a reactor, such as at the perforated trays thereof, as well as the overall retention time within the reactor, may be controllably varied in accordance with any desired predetermined parameters associated with the reaction occurring within the reactor and thus, instabilities which may occur in such a reaction can be externally compensated for without the necessity of changing the presized perforated trays. In addition, many other advantages will occur to one of ordinary skill in the art.

It is to be understood that the above described embodiments of the invention are merely illustrative of the principles thereof and that numerous modifications and embodiments of the invention may be derived within the sprit and scope thereof.

What is claimed is:

1. An apparatus for controllably introducing particulate material into the interior of a hollow reactor housing in a predetermined particulate material flow path having a predetermined direction of flow therethrough assisted by gravity in the direction of a desired process path of reaction within said reactor for enabling said reaction of said flowing particulate material within said process path, said apparatus comprising means for injecting said particulate material into said gravity assisted flow path within said housing interior, a walled chamber means disposed within said housing interior at a first predetermined level within said process path and having an inlet end thereof disposed in flow path communication with said injection means for intercepting said injected particulate material and collecting said intercepted particulate material within said walled chamber through said inlet end thereof, said walled chamber having a first walled inlet portion at said inlet end for initially collecting said intercepted material therewithin, said inlet portion having a first internal diameter, said walled chamber further comprising a second walled outlet portion connected to said inlet portion and having an upstanding wall with a base portion at the bottom thereof for collecting said material thereon, said outlet portion having a greater internal diameter than said inlet portion internal diameter with said inlet and outlet portions being spaced apart to form an angulated outlet for said chamber along said upstanding wall thereof, said spacing between said inlet and outlet portions of said walled chamber establishing a pile of said collected intercepted particulate material therewithin at said first predetermined level having an unsupported surface oriented to the horizontal between said spaced apart inlet and outlet portions at said first predetermined level at a predetermined natural angle of repose of said particulate material within said walled chamber which natural angie of repose defines an equilibrium condition for said collected particulate material pile, said walled chamber angulated outlet disposed along said unsupported surface, and means disposed within said collected particulate material pile at said first predetermined level for disturbing said natural angle of repose equilibrium condition irrespective of any fluidization characteristic of said collected particulate material for impelling a portion of said collected intercepted particulate material at said first predetermined level from said unsupported oriented surface through said outlet toward a second predetermined level within said process path, said disturbing means comprising means disposed within the interior of said collected particulate material pile substantially at the location of said angulated outlet for introducing a thin stream of fluid from within said collected particulate material pile at said angulated outlet location in the same direction as said predetermined direction of particulate material flow, whereby said fluid stream optimally disturbs said equilibrium condition to control the retention time of said collected intercepted particulate material within said process path at said first predetermined level independently of any fluidization characteristics of said collected particulate material pile.

2. An apparatus in accordance with claim 1 wherein said collected particulate material has a predetermined density corresponding to a predetermined quantity of particulate material for said impelled portion thereof, said fluid introducing means including means disposed within said chamber for controllably varying the rate of flow of said stream of fluid in accordance with variations in said density.

3. An apparatus in accordance with claim 2 wherein said fluid stream rate control means comprises a closed feedback loop including sensor means located within said chamber for sensing the gas pressure within said chamber and generating a control signal in accordance with variations in such gas pressure, predetermined values of said gas pressure corresponding to predetermined densities of said collected particulate material, and regulation means for regulating the rate of flow of said stream of fluid operatively connected to said sensor means, said regulation means being responsive to said control signal for varying the rate of flow of said fluid stream in accordance therewith.

4. An apparatus in accordance with claim 1 wherein said collected particulate material has a predetermined density corresponding to a predetermined quantity of particulate material for said impelled portion thereof, said fluid introducing means including means disposed within said chamber for controlling the rate of flow of said stream of fluid in accordance with variations in said density.

* * * * *